United States Patent [19]

Walters

[11] 4,408,257
[45] Oct. 4, 1983

[54] CATHODE ELECTRODE FOR AN ELECTRICAL DEVICE

[75] Inventor: Charles W. Walters, Indianapolis, Ind.

[73] Assignee: Emhart Industries, Inc., Indianapolis, Ind.

[21] Appl. No.: 214,014

[22] Filed: Dec. 8, 1980

[51] Int. Cl.³ .............................................. H01G 9/00
[52] U.S. Cl. .................................................... 361/433
[58] Field of Search ........................................ 361/433

[56] References Cited

U.S. PATENT DOCUMENTS

| 3,523,220 | 8/1970 | Harding | 361/433 |
|---|---|---|---|
| 3,531,693 | 9/1970 | Buice | 361/433 |
| 3,548,265 | 12/1970 | Buice et al. | 361/433 |
| 3,628,103 | 12/1971 | Booe | 361/433 |
| 4,016,465 | 4/1977 | Walters | 361/433 |
| 4,020,401 | 4/1977 | Cannon et al. | 361/433 |
| 4,159,509 | 6/1979 | Walters | 361/433 |

Primary Examiner—Andrew J. James
Assistant Examiner—Seth M. Nehrbass
Attorney, Agent, or Firm—Robert F. Meyer; David W. Gomes

[57] ABSTRACT

A cathode electrode of copper-based material adapted for use in an electrical device is provided with a deposit of silver coated with a finely divided electrically conductive material such as graphite palladium or platinum. The silver deposit is formed by reacting a dilute solution of sodium-silver cyanide with the copper-based cathode electrode. When utilized in an electrolytic capacitor, the cathode electrode helps to increase the capacitance of the cathode electrode and the contact of the copper-based material to an acid electrolyte is uniformly distributed over a large area to provide extended operation with high ripple current with deep cycles of charge and discharge.

3 Claims, 1 Drawing Figure

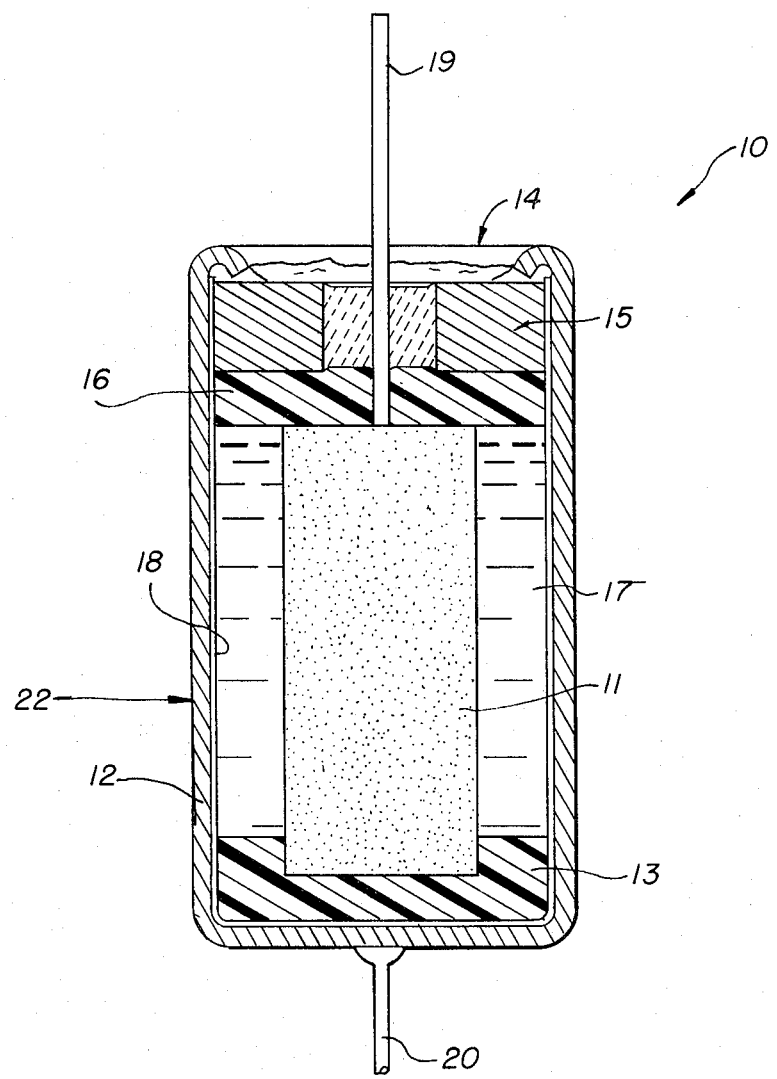

CATHODE ELECTRODE FOR AN ELECTRICAL DEVICE

BACKGROUND OF THE INVENTION

The present invention relates to electrical devices, and more particularly, to cathode electrodes adapted for use in electrolytic, dielectric oxide film-forming metal anode capacitors and the like.

While the present invention will be discussed hereinafter with reference to use in electrolytic capacitors, it is to be understood that the invention may be utilized in a variety of other electrical devices where a cathode electrode is required.

Electrolytic capacitors of the sintered dielectric oxide film-forming metal anode type generally consist of a cathode electrode, an electrically conductive electrolyte and a porous anode with a dielectric oxide film formed thereon. Typically, the cathode electrode is composed of silver, an alloy of silver, copper, or an alloy of copper to impart high electrical conductivity and corrosion resistance, the electrolyte is an aqueous solution of an inorganic acid, and the anode is composed of a film-forming metal such as tantalum, aluminum, or niobium, preferably tantalum.

In most situations, the cathode electrode also functions as the case or housing for the electrolytic capacitor by surrounding and retaining both the anode and the electrolyte. Present practice is to utilize silver as a main constituent of the cathode electrode because of the desirable electrical and chemical properties of silver. Due to the relatively high cost of silver, it would be advantageous to use copper or copper alloys for the cathode electrode while still retaining the performance characteristics of silver-based cathode electrodes.

The anode in this type of electrolytic capacitor is generally formed by pressing powders of the particular film-forming metal into the desired shape and then sintering the pressed powder. The resultant sintered anode is characterized as having a myriad of interconnecting void areas and therefore has a very large surface area per unit of volume which contributes greatly to the capacitance of the device in which it is utilized. A dielectric oxide film of the metal is then formed over the anode, typically by an electrolytic anodization process.

While the anode exhibits a relatively large capacitance, the interface between the cathode electrode and the electrolyte has an inherent charge separation due to polarization and thus exhibits a cathodic capacitance. This cathodic capacitance due to polarization may result from the formation of an asymmetric conductive film on the cathode electrode surface or from electrochemically developed insoluble insulating films or gas polarization films on the cathode electrode surface.

Since both the anode and cathode electrode possess inherent asymmetric conducting properties, the two electrodes are series-opposed with respect to their arrangement in the capacitor structure. When under the influence of an applied pulsating voltage, the electrodes charge and discharge alternately; that is, one electrode discharges as the other charges. As a consequence, the electrolyte between the electrodes remains at a negative potential toward the external electrodes throughout an alternating cycle. This differs from the charge-discharge function of two ordinary electrostatic capacitors connected in series, however, the law governing the admittance of the circuit remains the same: $1/C$ (device) $= 1/C$ (anode) $+ 1/C$ (cathode) where C is capacitance. This relationship results in the condition that the charge transfer is limited by the smaller of the two capacitances in either arrangement.

In the design of electrolytic capacitors, particularly relating to capacitor rating, the design is established invariably from the design parameters of the anode. Therefore, the cathode capacitance should be made several orders of magnitude higher than the anode capacitance by suitable arrangement or treatment so as to be compatible with the anode design. Thus, the term $1/C$ (cathode) in the above relation would become small relative to the other terms and the device capacitance would become essentially equal to the anode capacitance. Ideally, the operating characteristics of the capacitor approach optimum stability as the cathode capacitance approaches infinity. This condition, of course, can be attained only approximately in practical design of capacitors.

Several methods are known to increase the capacitance of the cathode electrode in electrolytic, film-forming metal capacitors and they include;

(1) applying to the surface of the cathode electrode a layer of finely divided, substantially inert conductive material such as carbon or certain of the platinum metals or gold; when properly applied, these materials provide a very high cathode surface area necessary for cathode capacitance, or (2) providing certain metal ions in the electrolyte which are capable of being electro-deposited on a cathode electrode of a suitable metal and dissolved therefrom in substantially the exact proportion of the current flowing back and forth across the cathode-electrolyte interface.

In system (1), it is thought that the current traversing the electrolyte-cathode junction discharges hydrogen or hydroxyl ions which are absorbed on the surface of the metal to yield a dielectric film. In system (2), it is believed the electrochemical discharge and dissolution of metal ions creates an ionic double layer in the electrolyte at the cathode electrode surface, and the space charge across this layer exhibits a high capacitance.

Since film-forming metal anode type capacitors are usually made as small as possible and the anode capacitance is therefore very high per device volume, the usual practice is to employ both methods of increasing the capacitance of the cathode electrode. However, applying the layer of finely divided conductive material to the surface of the cathode electrode is generally tedious and costly, especially when gold or platinum are utilized. The method generally involves the steps of cleaning the cathode electrode, applying a coat of masking material over a portion of the cathode electrode surface, etching the surface with an acid, rinsing, filling with plating solution, electroplating with a platinum anode, removing the anode and plating solution, rinsing, drying and removing the mask material.

FEATURES OR OBJECTS OF THE INVENTION

It is, therefore, a feature of the present invention to provide a copper-based cathode electrode for an electrical device with a layer or coating thereon to help increase the capacitance of the cathode by increasing the effective surface area of the cathode electrode. Another feature of the present invention is such a cathode electrode which provides extended operation with high ripple current and with deep cycles of charge-discharge. Another feature of the invention is to provide such a cathode electrode having a surface which includes a deposit of silver coated with a finely divided electrically conductive material. Still another feature of the invention is the provision of such a cathode wherein the finely divided electrically conductive material is graphite, platinum, or palladium. Another feature of the invention is the provision of such a cathode electrode wherein the silver deposit is formed by reacting a dilute solution of sodium-silver cyanide with the cathode electrode. Another feature of the invention is the provision of a method of forming the cathode electrode which includes relatively few process steps. The following description is taken in conjunction with the accompanying drawing.

BRIEF DESCRIPTION OF THE DRAWINGS

The sole FIGURE is a sectional view of a typical electrolytic, film-forming metal anode capacitor employing the features of the invention.

SUMMARY OF THE INVENTION

Generally, the present invention comprehends a cathode electrode for an electrical device wherein the cathode electrode is composed of a copper-based material and has a surface that includes a deposit of silver coated with a finely divided electrically conductive material. The invention also comprehends a method for applying the deposit to the cathode electrode surface which includes reacting the cathode surface with a dilute solution of sodium-silver cyanide. The invention is particularly adapted for use in electrolytic, film-forming metal anode capacitors where a high cathodic capacitance and stable electrical characteristics are desired.

DETAILED DESCRIPTION OF THE INVENTION

The invention can be more clearly understood with reference to the drawing. The FIGURE is a cross-sectional view of an electrolytic capacitor 10 containing a dielectric oxide fiom-forming metal anode 11 with anode riser 19. The anode 11 has a dielectric oxide film or layer (not shown) over its surface. In combination with anode 11 is cathode electrode 12 which also serves as the housing or case 22 for capacitor 10. The anode 11 is retained within the cathode housing 12 by means of the insulative bottom spacer 13 and end seal assembly 14. End seal assembly 14 is shown as a glass-to-metal seal 15 in conjunction with a resilient washer 16, but the end seal assembly forms no part of the present invention and, as is known in the art, a wide variety of different types of structures may be employed to close the open end of the housing 12. Electrolyte 17 contacts the anode 11 and the interior surface coating 18 of the cathode electrode 12. External electrical terminal for the cathode electrode is provided by cathode lead 20.

The operating electrolyte 17 for the capacitor is typically a dilute, non-oxidizing aqueous solution of an inorganic acid such as sulfuric acid, phosphoric acid, hydrochloric acid, and the like. The presently preferred electrolyte is a 39 wt.% solution of sulfuric acid. To help prevent corrosion of the interior surfaces of the cathode electrode 12 by the electrolyte 17, preferably the electrolyte is deaerated by means such as refluxing in a closed system before being added to the capacitor 10.

Anode 11 is composed of a dielectric oxide film-forming metal such as tantalum, aluminum, titanium, zirconium or niobium, preferably tantalum.

According to the present invention, the cathode electrode 12 is composed of a copper-based material, that is, a material containing at least 50 wt.% copper. Preferably, the copper-based material contains at least 90% copper. One particularly advantageous material is argentiferous copper, CDA #116, which is a copper based alloy containing about 25 troy ounces of silver per ton of copper, or about 0.1 wt.% silver. This copper alloy has desirable mechanical properties such as ductility, retention of work-hardened temper over the operating temperature range of a typical capacitor, and good corrosion resistance.

As mentioned previously, the surface area of the case or housing acting as a cathode electrode 12 in the capacitor 10 should be significantly increased so as to take full advantage of the capacitance of the anode 11. Conventional methods of accomplishing this end include platinization by electrochemical means and application of an articifial graphite coating by means of a liquid dispersion or paint.

While conventional methods may be adequate for some purposes, it has been found that treatment of the interior of the cathode electrode 12 can be accomplished in fewer steps and, therefore, generally at a lower cost, by forming a deposit 18 of silver coated with a finely divided electrically conductive material of either platinum or palladium. To form the silver deposit on the copper-based cathode electrode, the interior surface of the case 22 serving as the cathode electrode 12 is chemically cleaned by use of reagents such as ammonium persulfate, nitric acid, or by other suitable means well known in the art. The clean case is then filled with a dilute solution of sodium-silver cyanide and allowed to react with the cathode electrode for from about one to two minutes. A preferred solution would be 1 ounce of silver and 2 ounces of sodium per 1 gallon of cyanide. A bright, adherent silver deposit of from about $10^{-4}$ to $10^{-5}$ inches forms on the interior surface. The interior surface is next coated with a finely divided electrically conductive material such as graphite, platinum, or palladium. Such coating can be applied by electrodeposition of the metals platinum or palladium from a solution of the corresponding metal chloride, or by painting a suspension of their graphite granules on the interior surface, all in a manner well known in the art. A coating thickness of from about $10^{-4}$ to $10^{-5}$ inches has been found to be suitable.

A capacitor cathode prepared by this method is characterized by an extremely large series capacitance; also the contact of the copper base material to the acid electrolyte is uniformly distributed over a large area. The requirements for extended operation with high ripple current and with deep cycles of charge-discharge are thereby fulfilled. A minimum of attrition of the cathode by electrochemical decomposition results, which under less favorable condition could lead to early erosion of the case, or short circuiting the capacitor electrodes, and the method is greatly simplified in comparison to conventional methods such as platinization of the cathode electrode surface.

EXAMPLE

A group of 450 uf capacitor of 6 and 25 volt rating are prepared according to the present invention.

A copper-based cathode case composed of CDA #116 silver-copper, tough pitch, is fabricated with a length of about 0.677 inches and a diameter of about 0.187 inches. The interior of the housing is chemically cleaned with a solution of ammonium persulfate and rinsed with de-ionized water and then the excess water drained. The case is then filled with a solution of 1% silver and 2% sodium to 1 gallon of cyanide and allowed to react for one to two minutes. A bright adherent silver of from about $10^{-4}$ to $10^{-5}$ inches is formed on the interior of the case. A coating of about $10^{-4}$ to $10^{-5}$ inches in thickness of platinum was then formed on the interior surface by electro-deposition of a chloride of the metal. An electrolyte of de-aerated 39 wt.% $H_2SO_4$ is then poured into the housing. A sintered tantalum anode with a dielectric oxide coating and a length of about 0.503 inches is placed in the electrolyte and the open end of the housing sealed with an appropriate seal assembly to provide a capacitor as shown in the drawing.

Loss of capacitance of these capacitors was compared with capacitors of the same type as that of the drawing but having a copper-based cathode electrode with a graphite coating but without the silver deposit. Both sets of capacitors were compared after life tests at 125° C. with comparisons being made at 250, 500, 1500 and 2000 hours. It was found that capacitor loss was 12% less with capacitors of the present invention, at 2% capacitance loss in 2000 hours, compared with 14% or more on graphite coated cathodes.

What is claimed is:

1. A capacitor comprising an anode electrode, a copper-based cathode electrode, and dielectric means between the anode electrode and the copper-based cathode electrode, the copper-based cathode electrode including a surface contacted by at least semi-liquid electrolyte, said surface further including a deposit of silver coated with a finely divided electrically conductive material taken from the group consisting essentially of graphite, platinum and palladium.

2. A capacitor according to claim 1, and an electrolyte contacting the anode electrode and the cathode electrode surface.

3. A capacitor according to claim 1, wherein the anode electrode comprises a film-forming metal and has a dielectric oxide film of the film-forming metal contacting the anode electrode, and the capacitor contains electrolyte contacting the dielectric oxide film of the anode electrode and the deposit on the cathode electrode surface.

* * * * *